United States Patent
Li et al.

(10) Patent No.: US 11,328,449 B2
(45) Date of Patent: May 10, 2022

(54) IMAGE PROCESSING APPARATUS, METHOD FOR IMAGE PROCESSING, AND ELECTRONIC DEVICE

(71) Applicant: GUANGDONG OPPO MOBILE TELECOMMUNICATIONS CORP., LTD., Guangdong (CN)

(72) Inventors: Xiaopeng Li, Guangdong (CN); Tao Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 12 days.

(21) Appl. No.: 16/834,041

(22) Filed: Mar. 30, 2020

(65) Prior Publication Data
US 2020/0327698 A1 Oct. 15, 2020

(30) Foreign Application Priority Data

Apr. 10, 2019 (CN) .......................... 201910285823.6

(51) Int. Cl.
*G06T 7/90* (2017.01)
*G06T 5/00* (2006.01)
(Continued)

(52) U.S. Cl.
CPC .............. *G06T 7/90* (2017.01); *G06T 5/002* (2013.01); *G06T 5/50* (2013.01); *G06T 9/00* (2013.01);
(Continued)

(58) Field of Classification Search
CPC .. G06T 7/90; G06T 5/002; G06T 5/50; G06T 9/00; G06T 2200/28; G06T 2207/10024;
(Continued)

(56) References Cited

U.S. PATENT DOCUMENTS

2015/0229847 A1  8/2015  Aoki et al.
2015/0229855 A1*  8/2015  Talvala ................. H04N 5/357
348/322
(Continued)

FOREIGN PATENT DOCUMENTS

CN  102483508 A  5/2012
CN  102567935 A  7/2012
(Continued)

OTHER PUBLICATIONS

International search report issued in corresponding international application No. PCT/CN2020/081713 dated May 27, 2020.
(Continued)

*Primary Examiner* — Emily C Terrell
*Assistant Examiner* — Molly Delaney
(74) *Attorney, Agent, or Firm* — Young Basile Hanlon & MacFarlane, P.C.

(57) ABSTRACT

An image processing apparatus, a method for image processing, and an electronic device are provided. The image processing apparatus includes a Hardware Abstract Layer (HAL), an application (APP) coupled with the HAL, and an Algo Process Service (APS). The HAL is configured to receive a RAW image, to convert the RAW image into a YUV image, and to transmit the RAW image and/or the YUV image to the APP. The APP is configured to transmit the RAW image and/or the YUV image to the APS. The APS is coupled with the HAL via the APP and stores at least one image processing algorithm for image post-processing, and the APS is configured to process, with the at least one image processing algorithm, the RAW image and/or the YUV image.

19 Claims, 9 Drawing Sheets

(51) Int. Cl.
  *G06T 5/50* (2006.01)
  *G06T 9/00* (2006.01)
(52) U.S. Cl.
  CPC ............... *G06T 2200/28* (2013.01); *G06T 2207/10024* (2013.01)
(58) Field of Classification Search
  CPC .... G06T 1/20; H04N 1/2129; H04N 1/00938; H04N 5/23229; H04N 5/23225
  See application file for complete search history.

(56) References Cited

U.S. PATENT DOCUMENTS

| | | | |
|---|---|---|---|
| 2016/0277721 A1* | 9/2016 | Roffet | H04N 9/04557 |
| 2016/0353000 A1* | 12/2016 | Corcoran | H04M 1/0264 |

FOREIGN PATENT DOCUMENTS

| CN | 103458188 A | | 12/2013 |
|---|---|---|---|
| CN | 103475894 A | | 12/2013 |
| CN | 103475894 A | * | 12/2013 |
| CN | 103559150 A | | 2/2014 |
| CN | 104657956 A | | 5/2015 |
| CN | 105827971 B | | 8/2016 |
| CN | 105979235 A | | 9/2016 |
| CN | 106127698 A | | 11/2016 |
| CN | 106303226 A | | 1/2017 |
| CN | 106303226 A | * | 1/2017 |
| CN | 107395967 A | | 11/2017 |
| CN | 108833804 A | | 11/2018 |
| CN | 109101352 A | | 12/2018 |
| CN | 109194855 A | | 1/2019 |
| CN | 110062161 A | | 7/2019 |
| CN | 110278386 A | | 9/2019 |
| JP | H04241682 A | | 8/1992 |
| KR | 20160020918 A | | 2/2016 |

OTHER PUBLICATIONS

Extended European search report issued in corresponding European application No. 20167197.1 dated Aug. 12, 2020.
English Translation of the first office action issued in corresponding CN application No. 201910285823.6 dated Aug. 19, 2020.
Chinese Second Office Action with English Translation for CN Application 201910285823.6 dated Apr. 6, 2021. (22 pages).
Indian Examination Report for IN Application 202014014233 dated May 31, 2021. (7 pages).
Qingdong et al.. An Efficient Spatial Adaptive Image Post-Processing Algorithm for MPEG-4 Video, Journal of Harbin Engineering University, vol. 33 No. 11, Nov. 2012, 7 pages.
Chinese Notification to Grant Patent Right for Invention with English Translation for CN Application 201910285823.6 dated Sep. 3, 2021. (6 pages).

* cited by examiner

IMAGE PROCESSING APPARATUS, METHOD FOR IMAGE PROCESSING, AND ELECTRONIC DEVICE

CROSS-REFERENCE TO RELATED APPLICATION(S)

This application claims priority to Chinese Patent Application Serial No. 201910285823.6, filed on Apr. 10, 2019, the entire disclosure of which is hereby incorporated by reference.

TECHNICAL FIELD

This disclosure relates to the technical field of image processing, and more particularly to an image processing apparatus, a method for image processing, and an electronic device.

BACKGROUND

At present, image post-processing, such as beauty processing, filter processing, rotation processing, watermark processing, blurring processing, High-Dynamic Range (HDR) processing, or multi-frame processing is generally conducted in a Hardware Abstract Layer (HAL). Generally, the HAL is provided by one manufacturer, and image processing algorithms for image post-processing are provided by another manufacturer. To write the image processing algorithms into the HAL, a process truncating operation needs to be performed on the image processing algorithms on a basis of algorithm architectures of the HAL, and difficult design may be brought due to coupling of the image processing algorithms and the algorithm architectures of the HAL.

SUMMARY

Implementations provide an image processing apparatus. The image processing apparatus includes a Hardware Abstract Layer (HAL), an application (APP), and an Algo Process Service (APS). The HAL is configured to receive a RAW image, to convert the RAW image into a YUV image, and to transmit at least one of the RAW image or the YUV image to the APP. The APP is coupled with the HAL and configured to transmit the at least one of the RAW image or the YUV image to the APS. The APS is coupled with the HAL via the APP and stores at least one image processing algorithm for image post-processing, and the APS is configured to process, with the at least one image processing algorithm, the at least one of the RAW image or the YUV image.

Implementations further provide a method for image processing. The method includes the following. A HAL receives a RAW image, converts the RAW image into a YUV image, and transmits the at least one of the RAW image or the YUV image to an APP. When an APS receives the RAW image from the APP, the APS processes, with at least one image processing algorithm, the RAW image from the APP so as to achieve image post-processing. When the APS receives the YUV image from the APP, the APS processes, with the at least one image processing algorithm, the YUV image from the APP so as to achieve image post-processing.

Implementations further provide an electronic device. The electronic device includes an image processing apparatus and an image sensor coupled with the image processing apparatus. The image processing apparatus includes a HAL, an APP coupled with the HAL, and an APS coupled with the HAL via the APP. The HAL is configured to receive a RAW image, to convert the RAW image into a YUV image, and to transmit at least one of the RAW image or the YUV image to the APP. The APP is configured to transmit the at least one of the RAW image or the YUV image to the APS. The APS stores at least one image processing algorithm for image post-processing and is configured to process, with the at least one image processing algorithm, the at least one of the RAW image or the YUV image.

BRIEF DESCRIPTION OF DRAWINGS

The described-above and/or additional aspects and advantages of the implementations will become apparent and be easily understood from the description of the implementations in conjunction with the following drawings.

DETAILED DESCRIPTION

The following describes implementations in detail. Examples of the implementations are illustrated in the accompanying drawings, where the same or like reference numerals represent the same or like elements or elements having the same or similar functions. The implementations described below with reference to the accompanying drawings are illustrative and are merely intended to explain the disclosure rather than limit the disclosure.

The following describes many different implementations or examples for illustrating different structures of the implementations. To simplify the description of the disclosure, the following merely describes components and settings of some examples. It will be appreciated that the following implementations are illustrative and are not intended to limit the disclosure.

Figure 1:
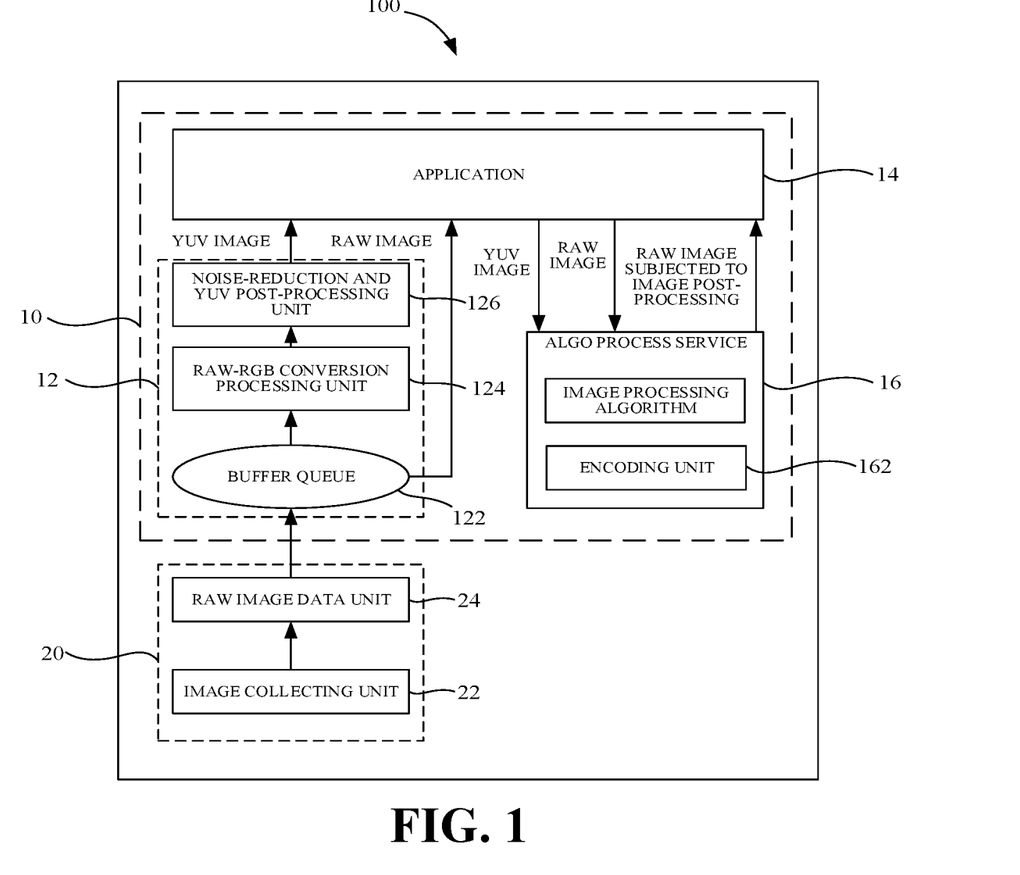
FIG. 1 is a schematic diagram illustrating a shooting device according to implementations.

A shooting device 100 is illustrated in FIG. 1. The shooting device 100 includes an image processing apparatus 10 and an image sensor 20 coupled with the image processing apparatus 10. The image sensor 20 includes an image collecting unit 22 and a RAW image data unit (e.g., image Front-end (IFE)) 24. The image collecting unit 22 is configured to receive lights to collect image data (a RAW image). The RAW image data unit 24 is configured to transmit the image data collected by the image collecting unit 22 to the image processing apparatus 10. In one example, the RAW image data unit 24 may process the RAW image collected by the image collecting unit 22 and transmit the RAW image processed to the image processing apparatus 10.

The image processing apparatus 10 includes a Hardware Abstract Layer (HAL) 12, an application (APP) 14, and an Algo Process Service (APS) 16.

In at least one implementation, the HAL 12 is configured to receive a RAW image, to convert the RAW image into a YUV image, and to transmit at least one of the RAW image or the YUV image to the APP 14. The HAL 12 is coupled with the image sensor 20. In at least one implementation, the HAL 12 includes a buffer queue 122 coupled with the image sensor 20, a RAW-RGB conversion processing unit 124 (e.g., Bayer Process Segment (BPS)), and a noise-reduction and YUV post-processing unit 126 (e.g., Image Process Engine (IPE)) coupled with the APP 14. The buffer queue 122 is configured to buffer the RAW image from the image sensor 20 and to transmit, via the APP 14, the RAW image from the image sensor 20 to the APS 16. The RAW-RGB conversion processing unit 124 is configured to convert the RAW image from the buffer queue 122 into an RGB image. The noise-reduction and YUV post-processing unit 126 is configured to convert the RGB image into the YUV image and to transmit, via the APP 14, the YUV image to the APS 16. In one example, the HAL 12 is further configured to transmit metadata of the image data to the APP 14, where the metadata includes 3a (i.e., automatic exposure (AE) control, automatic focus (AF) control, and automatic white balance (AWB) control) information, image information (e.g., a width and a height of the image), exposure parameters (e.g., a diaphragm size, a shutter speed, and a diaphragm value), and so on. The metadata can be used for assisting in performing image post-processing on the RAW image and/or the YUV image, for example, the metadata is used for assisting in performing at least one of beauty processing, filter processing, rotation processing, watermark processing, blurring processing, HDR processing, or multi-frame processing. For example, the metadata may include photosensibility (ISO) information, and according to the ISO information, brightness of the RAW image and/or YUV image can be adjusted, such that image post-processing related to brightness adjustment can be realized.

The HAL 12 receives the RAW image, converts the RAW image into the YUV image, and transmits the RAW image and/or the YUV image to the APP 14, the HAL 12 does not perform image post-processing on the RAW image and/or YUV image, and thus there is no need to perform a process truncating on the at least one image processing algorithm on a basis of algorithm architectures of the HAL 12, and only external compatibility is required, such that the difficulty of design can be reduced.

The HAL 12 is generally constructed by an application program interface (API) in the form of pipelines. Since construction of pipelines requires a lot of time and memory, all pipelines used in a corresponding working mode of a camera (such as, the shooting device 100) need to be constructed before the camera has been enabled successfully. In order to implement various image processing algorithms, a large number of pipelines (for example, more than three pipelines) need to be constructed, and thus a lot of time and memory may be needed to enable the camera. In the implementations, the HAL 12 receives the RAW image, converts the RAW image into the YUV image, and transmits the RAW image and/or the YUV image to the APP 14, the HAL 12 does not perform image post-processing on the RAW image and/or the YUV image, and thus only a small number of pipelines (for example, one or two pipelines) needs to be constructed in the HAL 12, which can save memory and make the camera be enabled fast.

The APP 14 is coupled with the HAL 12. The APP 14 may be configured to generate a control instruction in response to a user's input and to transmit, via the HAL 12, the control instruction to the image sensor 20 to control the operation of the image sensor 20. The APP 14 can run at 64 bits, and static data connection library (LIB) of the image processing algorithm for the image post-processing can also be configured as 64 bits to improve the operation speed. As one example, after receiving the RAW image and/or the YUV image from the HAL 12, the APP 14 may perform image post-processing on the RAW image and/or the YUV image, or may transmit the RAW image and/or the YUV image to the APS 16 to perform image post-processing. As another example, the APP 14 may perform some image post-processing, such as the beauty processing, the filter processing, the rotation processing, the watermark processing, and the blurring processing, and the APS 16 may perform other image post-processing, such as the HDR processing and the multi-frame processing. In the implementations, the APP 14 transmits the RAW image and/or the YUV image to the APS 16 to perform image post-processing.

The APS 16 is coupled with the HAL 12 via the APP 14. The APS 16 stores at least one image processing algorithm, for example, the APS 16 stores at least one of a beauty processing algorithm, a filter processing algorithm, a rotation processing algorithm, a watermark processing algorithm, a blurring processing algorithm, a HDR processing algorithm, or a multi-frame processing algorithm. The APS 16 is configured to process, with the at least one image processing algorithm, the RAW image and/or the YUV image so as to achieve image post-processing. Since image post-processing on the RAW image and/or the YUV image can be realized by the APS 16, there is no need to perform a process truncating on the at least one image processing algorithm on a basis of the algorithm architectures of the HAL 12, and only external compatibility is required, such that the difficulty of design can be reduced. In addition, since image post-processing is implemented by the APS 16, functions of the APS 16 are single and concentrated, such that the image processing algorithm can be fast transplanted and expansion of new image processing algorithms may be simple. Furthermore, if the APP 14 performs some image post-processing, such as the beauty processing, the filter processing, the rotation processing, the watermark processing, and the blurring processing, and the APS 16 performs other image post-processing, such as the HDR processing and the multi-frame processing, the APP 14 can also store the at least one image processing algorithm for image post-processing, for example, the APP 14 can also store at least one of the beauty processing algorithm, the filter processing algorithm, the rotation processing algorithm, the watermark processing algorithm, the blurring processing algorithm, the HDR processing algorithm, or the multi-frame processing algorithm. In this case, the APP 14 is further configured to process, with the at least one image processing algorithm, the RAW image and/or the YUV image. Since image post-processing on the RAW image and/or the YUV image can be realized by the APP 14 and the APS 16, there is no need to perform a process truncating on the at least one image processing algorithm on a basis of the algorithm architectures of the HAL 12, and only external compatibility is required, such that the difficulty of design can be reduced.

As one example, when the APS 16 merely processes the RAW image (for example, when the APS 16 processes, with the at least one image processing algorithm, the RAW image), the HAL 12 transmits only the RAW image, and there is no need to convert the RAW image into the YUV image. As another example, when the APS 16 merely processes the YUV image (for example, when the APS 16 processes, with the at least one image processing algorithm, the YUV image), the HAL 12 transmits only the YUV image. As yet another example, when the APS 16 processes both the RAW image and the YUV image, the HAL 12 transmits both the RAW image and the YUV image.

In one example, the HAL 12 can transmit a suggestion on the number of images to the APP 14 according to the ISO information, a shake detection result obtained by an angular speed sensor (e.g., a gyro sensor), and an augmented reality (AR) scene detection result (for example, a scene detection type, such as a person, an animal, a landscape, and so on). For example, when the gyro sensor detects that the shooting device 100 has a relatively large shake, the HAL 12 may transmit a suggestion that more images need to be transmitted to the APP 14, to well perform image post-processing. For another example, when the gyro sensor detects that the shooting device 100 has a relatively small shake, the HAL 12 may transmit a suggestion that fewer images need to be transmitted to the APP 14, to reduce the amount of data transmission. That is, the number of images that are suggested to be transmitted to the APP 14 by the HAL 12 have a positive correlation with the shake detection result obtained by the gyro sensor. In addition, the HAL 12 can transmit an algorithm suggestion to the APP 14 according to the ISO information, the shake detection result obtained by the gyro sensor, and the AR scene detection result. For example, when the shake detected by the gyro sensor is relatively large, the HAL 12 may transmit the algorithm suggestion to the APP 14 to suggest adopting the multi-frame processing algorithm to eliminate (reduce) the shake. For another example, when the scene detection type of the AR scene detection result is a person, the HAL 12 may transmit the algorithm suggestion to the APP 14 to suggest adopting the beauty processing algorithm to beautify the person. For yet another example, when the scene detection type of the AR scene detection result is a landscape, the HAL 12 may transmit the algorithm suggestion to the APP 14 to suggest adopting the HDR processing algorithm to obtain a HDR landscape image. On the other hand, the APP 14 can transmit a data request to the HAL 12 according to the suggestion on the number of images and the algorithm suggestion. The HAL 12 can transmit data to the APP 14 according to the data request received, and then the APP 14 transmits the data to the APS 16 to perform image post-processing.

In at least one implementation, when one shooting (exposure imaging) is completed, the image sensor 20 transmits shooting data (a RAW image) to the HAL 12. When the APS 16 receives the RAW image or a YUV image corresponding to the shooting data, the image sensor 20 can perform another shooting or can be closed, or the APP 14 can be closed or an application interface of the APP 14 can be exited. Since image post-processing is implemented by the APS 16, when the RAW image or the YUV image corresponding to the shooting data are transmitted to the APS 16, the APS 16 can implement image post-processing without cooperation of the image sensor 20 and the APP 14, such that the image sensor 20 can be closed or perform next shooting, and the APP 14 can also be closed or the application interface of the APP 14 can be exited. In this case, the shooting device 100 can realize snapshot. In addition, when the APS 16 performs image post-processing, the APP 14 can be closed or the application interface of the APP 14 can be exited, such that the user can operate the electronic device to perform other operations, for example, the user can browse web pages, watch a video, make a call, and perform other operations unrelated to the shooting device 100. In this way, the user does not need to spend a lot of time in waiting for completion of image post-processing, which is convenient for the user to use the electronic device.

In at least one implementation, the APS 16 includes an encoding unit 162, and the encoding unit 162 is configured to convert the YUV image into a JPG image (or a JPEG image). As one example, when the APS 16 processes the YUV image, the encoding unit 162 can directly encode the YUV image to obtain the JPG image, thereby improving a speed of outputting images. As another example, when the APS 16 processes the RAW image, the APS 16 may return, via the APP 14, the RAW image after being subjected to image post-processing to the HAL 12. For instance, the APS 16 may return, via the APP 14, the RAW image after being subjected to image post-processing to the RAW-RGB conversion processing unit 124, and the RAW-RGB conversion processing unit 124 may convert the RAW image received from the APS 16 via the APP 14 into an RGB image, and the noise-reduction and YUV post-processing unit 126 may convert the RGB image into the YUV image and then transmits, via the APP 14, the YUV image to the encoding unit 162 of the APS 16, whereby the encoding unit 162 can convert the YUV image into the JPG image. For another instance, the APS 16 may return, via the APP 14, the RAW image after being subjected to image post-processing to the buffer queue 122, the RAW image returned to the buffer queue 122 are converted by the RAW-RGB conversion processing unit 124 and the noise-reduction and YUV post-processing unit 126 into the YUV image, and then the YUV image is transmitted to the encoding unit 162 to be converted into the JPG image. In at least one implementation, the APS 16 is further configured to transmit the JPG image to a memory for storage after obtaining the JPG image.

Figure 2:
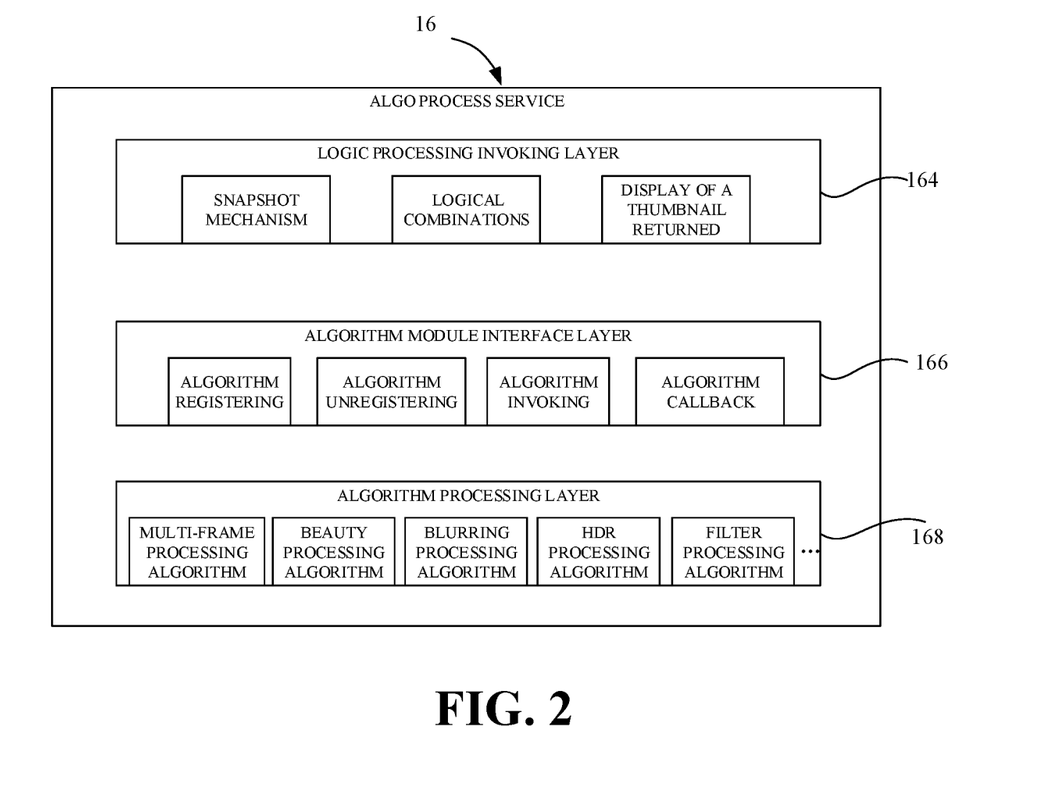
FIG. 2 is a schematic diagram illustrating an Algo Process Service (APS) according to implementations.

As illustrated in FIG. 2, the APS 16 includes a logic processing invoking layer 164 communicating with the APP 14, an algorithm module interface layer 166, and an algorithm processing layer 168 including the at least one image processing algorithm. The algorithm module interface layer 166 is configured to maintain an algorithm interface and to conduct, via the algorithm interface, at least one of an registering operation, an unregistering operation, an invoking operation, or a callback operation on the at least one image processing algorithm in the algorithm processing layer 168.

In one example, the logic processing invoking layer 164 may include a thread queue. After receiving the RAW image and/or the YUV image (that is, an image post-processing task), the APS 16 can buffer the image post-processing task in the thread queue to perform processing. The thread queue can buffer multiple image post-processing tasks, and thus the snapshot (i.e., a snapshot mechanism) can be implemented via the logic processing invoking layer 164. In addition, the logic processing invoking layer 164 can also receive initialization (init) instructions, processes, and other instructions from the APP 14, and store corresponding instructions and data in the thread queue. The logical processing invoking layer 164 invokes logics (that is, logical combinations) according to the image post-processing tasks in the thread queue. The logic processing invoking layer 164 can also return a thumbnail obtained to the APP 14 for display (that is, display of the thumbnail returned). In the implementations, "multiple" refers to two or more, unless otherwise specified.

The algorithm module interface layer 166 is configured to invoke the algorithm interface, and an invoking command can also be stored in the thread queue. When the algorithm processing layer 168 receives the invoking command in the thread queue, the algorithm processing layer 168 can parse parameters corresponding to the invoking command to obtain image processing algorithms to be invoked. For example, when the algorithm module interface layer 166 conducts an registering operation on the at least one image processing algorithm, a new image processing algorithm can be added in the algorithm processing layer 168. For another example, when the algorithm module interface layer 166 conducts an unregistering operation on an image processing algorithm, the image processing algorithm can be deleted from the algorithm processing layer 168. For yet another example, when the algorithm module interface layer 166 conducts an invoking operation on the at least one image processing algorithm, an image processing algorithm in the algorithm processing layer 168 can be invoked. For yet another example, when the algorithm module interface layer 166 conducts a callback operation on an image processing algorithm, data and state obtained via the image processing algorithm can be returned to the APP 14. In at least one implementation, the image processing algorithm can conduct, via a unique algorithm interface, the registering operation, the unregistering operation, the invoking operation, or the callback operation on the at least one image processing algorithm. Each image processing algorithm in the algorithm processing layer 168 is independent, such that it is convenient to conduct the registering operation, the unregistering operation, the invoking operation, or the callback operation on the at least one image processing algorithm.

Figure 3:
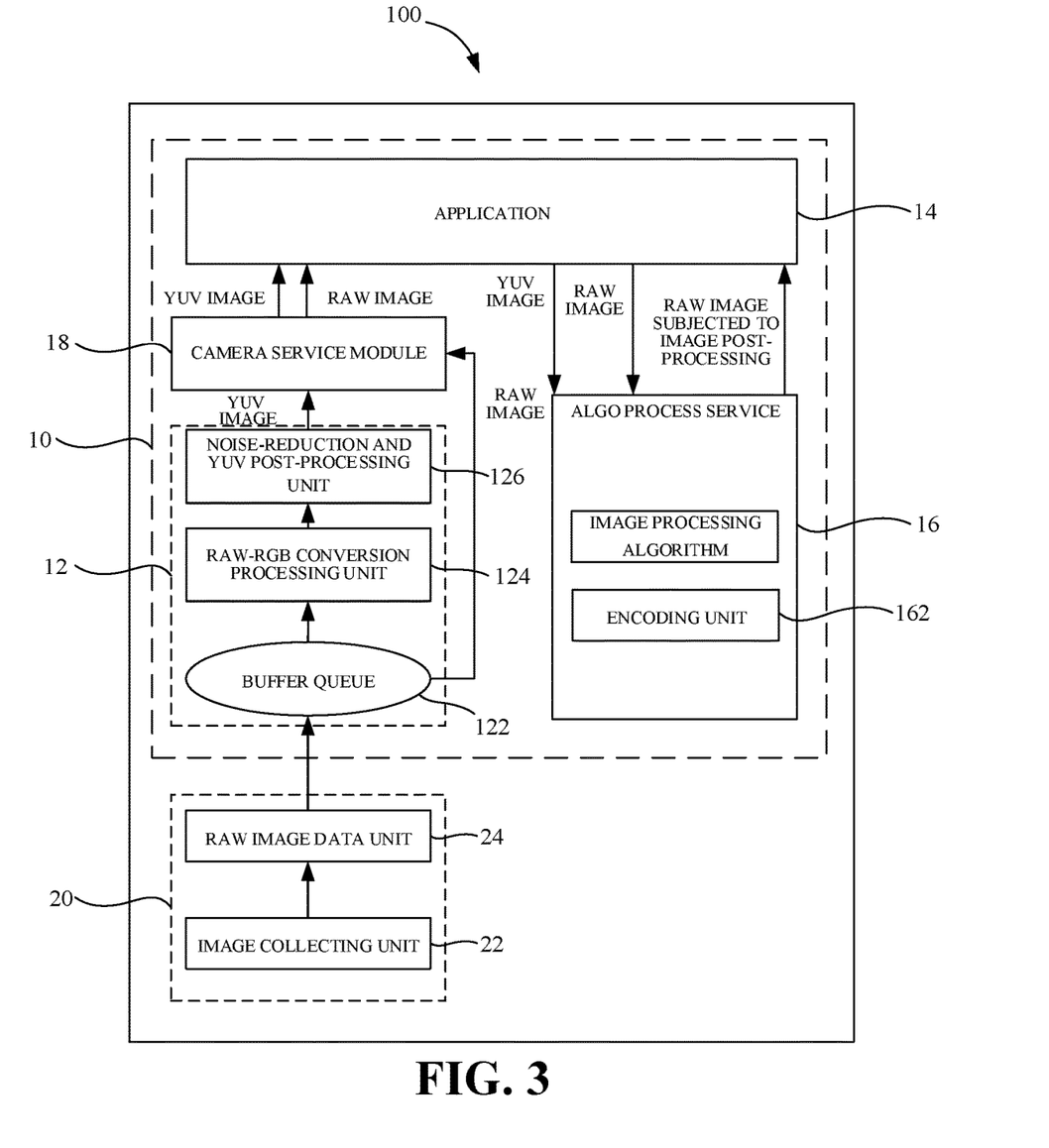
FIG. 3 is a schematic diagram illustrating a shooting device according to other implementations.

As illustrated in FIG. 3, in some implementations, the image processing apparatus 10 further includes a camera service module 18. The HAL 12 is coupled with the APP 14 via the camera service module 18. In at least one implementation, the camera service module 18 is configured to encapsulate the RAW image and/or the YUV image and transmit the RAW image and/or the YUV image encapsulated to the APP 14, and transmit RAW image returned by the APP 14 to the HAL 12. By encapsulating the images via the camera service module 18, the efficiency and the security of image transmission can be improved. In such a case that the image processing apparatus 10 includes the camera service module 18, transmission paths of data (images, metadata, and the like) in the image processing apparatus 10 may be adaptively adjusted, that is, the data that can be transmitted directly from the HAL 12 to the APP 14 need to be transmitted to the APP 14 through the camera service module 18. For example, when the HAL 12 transmits the RAW image and/or the YUV image to the APP 14, the HAL 12 first transmits the RAW image and/or the YUV image to the camera service module 18, and the camera service module 18 encapsulates the RAW image and/or the YUV image and then transmits the RAW image and/or the YUV image encapsulated to the APP 14. For another example, when the HAL 12 transmits metadata to the APP 14, the HAL 12 first transmits the metadata to the camera service module 18, and the camera service module 18 encapsulates the metadata and then transmits the metadata encapsulated to the APP 14. For yet another example, when the HAL 12 transmits a suggestion on the number of images to the APP 14, the HAL 12 first transmits the suggestion on the number of images to the camera service module 18, and the camera service module 18 encapsulates the suggestion on the number of images and then transmits the encapsulated suggestion on the number of images to the APP 14. For yet another example, when the HAL 12 transmits an algorithm suggestion to the APP 14, the HAL 12 first transmits the algorithm suggestion to the camera service module 18, and the camera service module 18 encapsulates the algorithm suggestion and transmits the algorithm suggestion encapsulated to the APP 14. It is to be understood that the HAL 12 can also transmit the ISO information, the shake detection result obtained by the gyro sensor, and the AR scene detection result to the camera service module 18, and the camera service module 18 obtains the suggestion on the number of images and/or the algorithm suggestion according to the ISO information, the shake detection result obtained by the gyro sensor, and the AR scene detection result, and then transmits the suggestion on the number of images and/or the algorithm suggestion to the APP 14.

The functional units in various implementations may be integrated into one processing unit, or each unit may be physically present, or two or more units may be integrated into one unit. The above-mentioned integrated unit can be implemented in the form of hardware or a software function unit.

Figure 4:
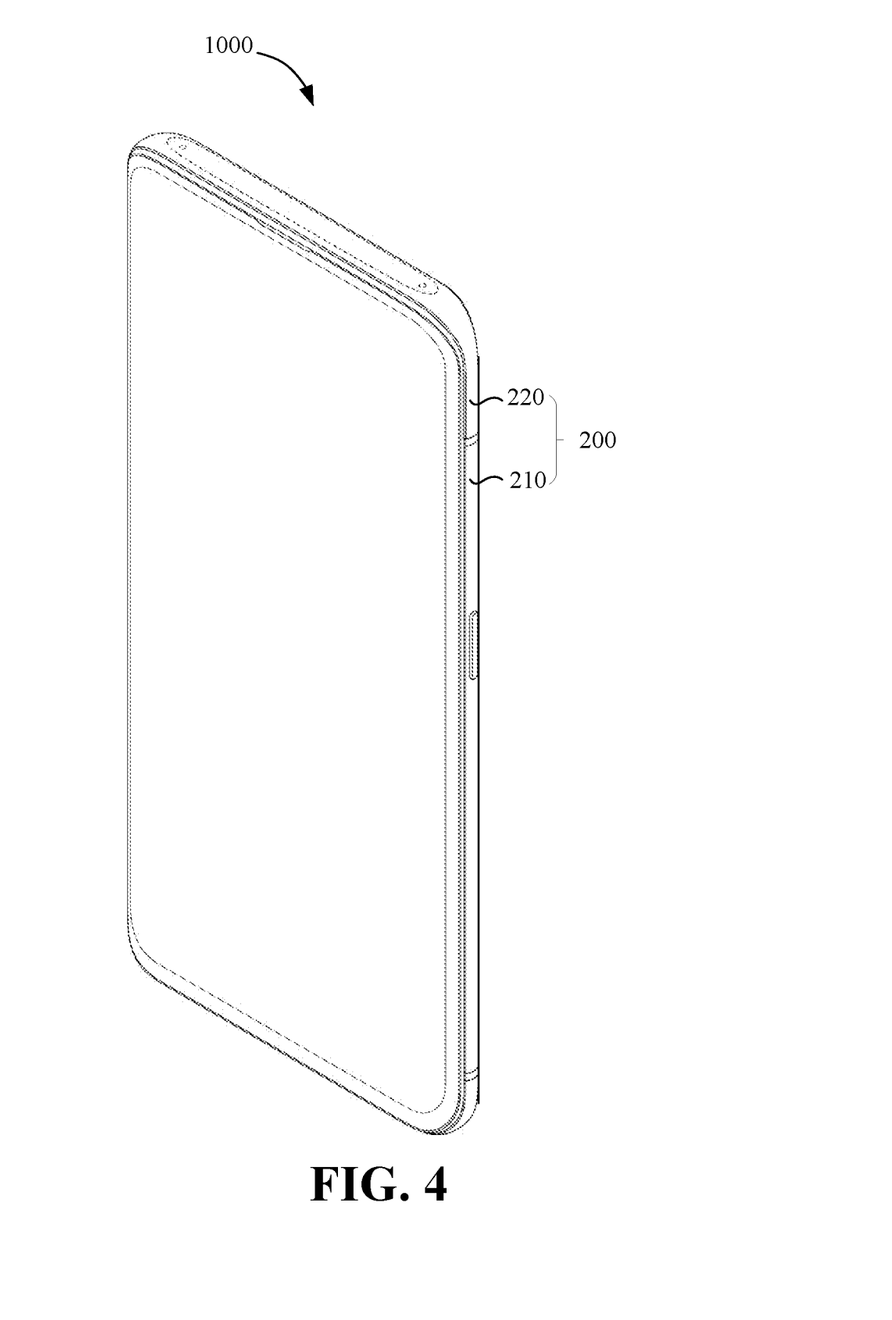
FIG. 4 is a schematic structural diagram illustrating an electronic device according to implementations.
Figure 5:
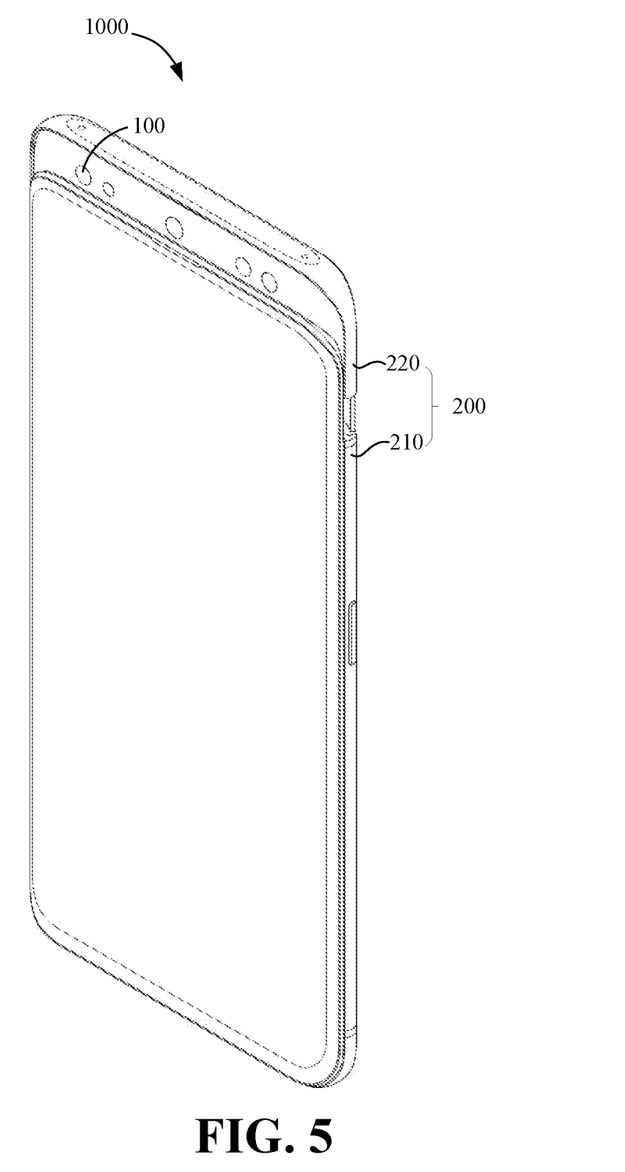
FIG. 5 is a schematic structural diagram illustrating an electronic device according to other implementations.

In FIG. 4 and FIG. 5, an electronic device 1000 is illustrated. The electronic device 1000 includes the shooting device 100 described in any of the implementations and a casing 200. The shooting device 100 is coupled with the casing 200. The casing 200 can be used as a carrier for accommodating functional elements of the electronic device 1000. The casing 200 can provide dust-proof, anti-breaking, water-proof, and other protection for the functional elements. The functional elements may include a display screen, the shooting device 100, a receiver, and the like. In one example, the casing 200 includes a main body 210 and a movable support 220. The movable support 220 is operable to slide relative to the main body 210 under the driving of a driving device, for example, the movable support 220 can slide relative to the main body 210 to slide into the main body 210 (a state illustrated in FIG. 4) or out of the main body 210 (a state illustrated in FIG. 5). Part of the functional elements can be installed on the main body 210, and the other part of the functional elements (such as, the shooting device 100) can be installed on the movable support 220. The other part of the functional elements can be retracted into the main body 210 or extended out of the main body 210 following movement of the movable support 220. In one example, the casing 200 defines a collecting window. The shooting device 100 is aligned with the collecting window so that the shooting device 100 can receive external lights through the collecting window to collect an image.

In the description of the implementations, it should be noted that, unless otherwise specified and limited, terms "installation", and "connection" should be understood broadly, for example, the "connection" may be a fixed connection, a detachable connection, or an integral connection. Alternatively, the "connection" may be a mechanical connection, an electrical connection, or a mutual communication. Alternatively, the "connection" may be a direct connection, or an indirect connection via a medium, or the "connection" may be communication of interiors of two elements or interaction of two elements. For the ordinary skilled in the art, the specific meanings of the terms can be understood according to different situations.

Figure 6:
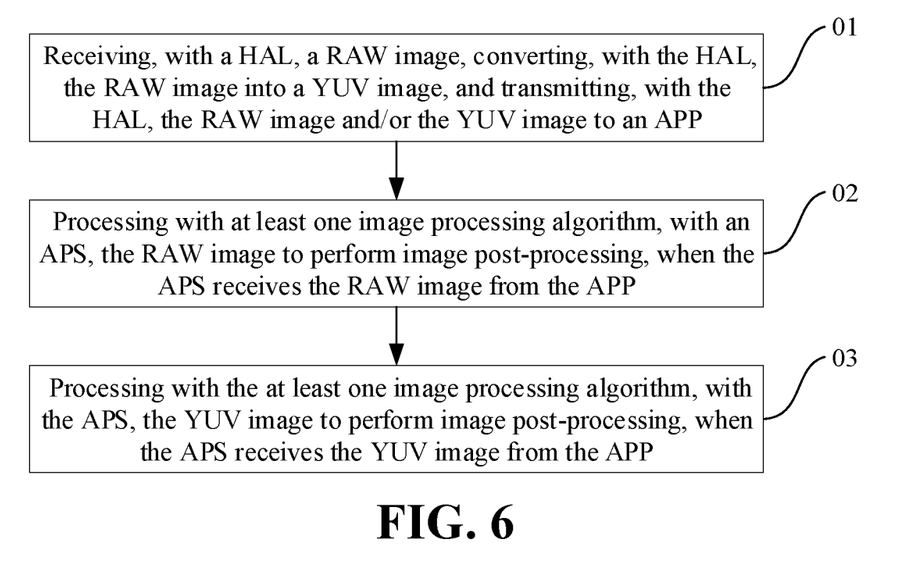
FIG. 6 to FIG. 11 are schematic flow charts illustrating a method for image processing according to at least one implementation.

As illustrated in FIG. 1 and FIG. 6, a method for image processing is provided, and the method begins at block 01.

At block 01, a HAL 12 receives a RAW image, converts the RAW image into a YUV image, and transmits the RAW image and/or the YUV image to an APP 14.

At block 02, when an APS 16 receives the RAW image from the APP 14, the APS 16 processes the RAW image with at least one image processing algorithm so as to achieve image post-processing.

At block 03, when the APS 16 receives the YUV image from the APP 14, the APS 16 processes the YUV image with the at least one image processing algorithm so as to achieve image post-processing.

The method for image processing can be implemented by the image processing apparatus 10, where the operation at block 01 can be implemented by the HAL 12, and the operations at block 02 and 03 can be implemented by the APS 16.

Figure 7:
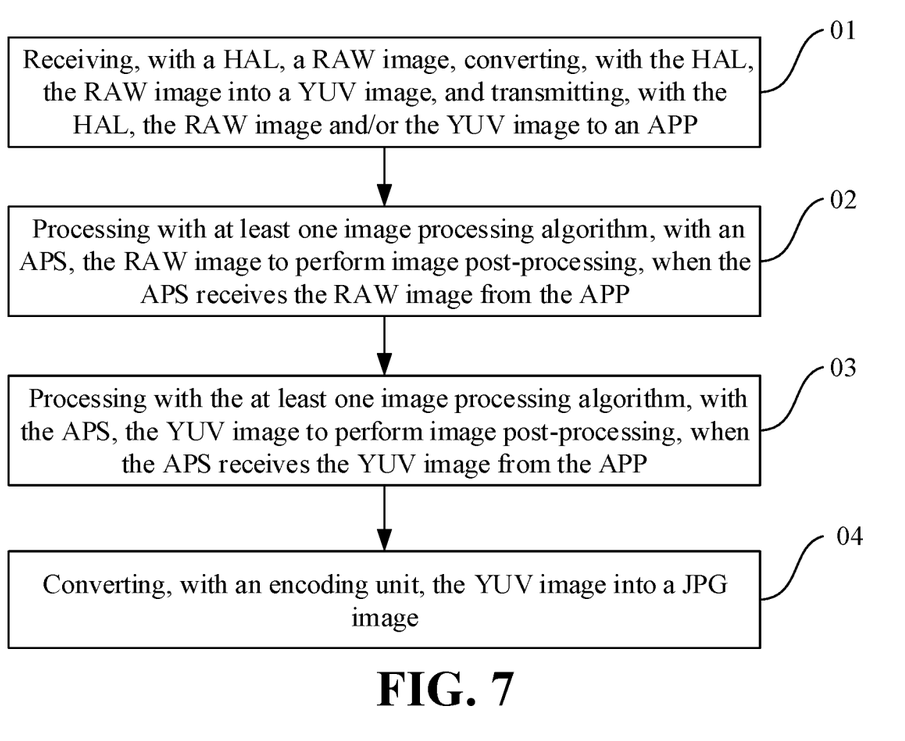

As illustrated in FIG. 1 and FIG. 7, the APS 16 includes an encoding unit 162. The method further includes the following.

At block 04, the encoding unit 162 converts the YUV image into a JPG image.

In the implementations, the operation at block 04 can be implemented by the encoding unit 162.

Figure 8:
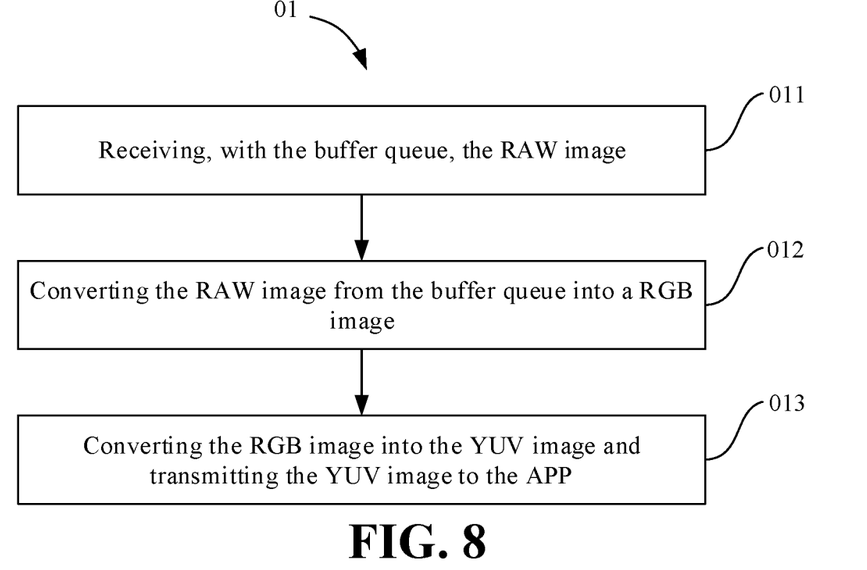

As illustrated in FIG. 1 and FIG. 8, the HAL 12 includes a buffer queue 122. The operation at block 01 is performed as follows.

At block 011, the buffer queue 122 receives the RAW image.

At block 012, the RAW image from the buffer queue 122 is converted into an RGB image.

At block 013, the RGB image is converted into the YUV image and the YUV image is transmitted to the APP 14.

In the implementations, the operation at block 011 can be implemented by the buffer queue 122, the operation at block 012 can be implemented by a RAW-RGB conversion processing unit 124, and the operation at block 013 can be implemented by a noise-reduction and YUV post-processing unit 126.

Figure 9:
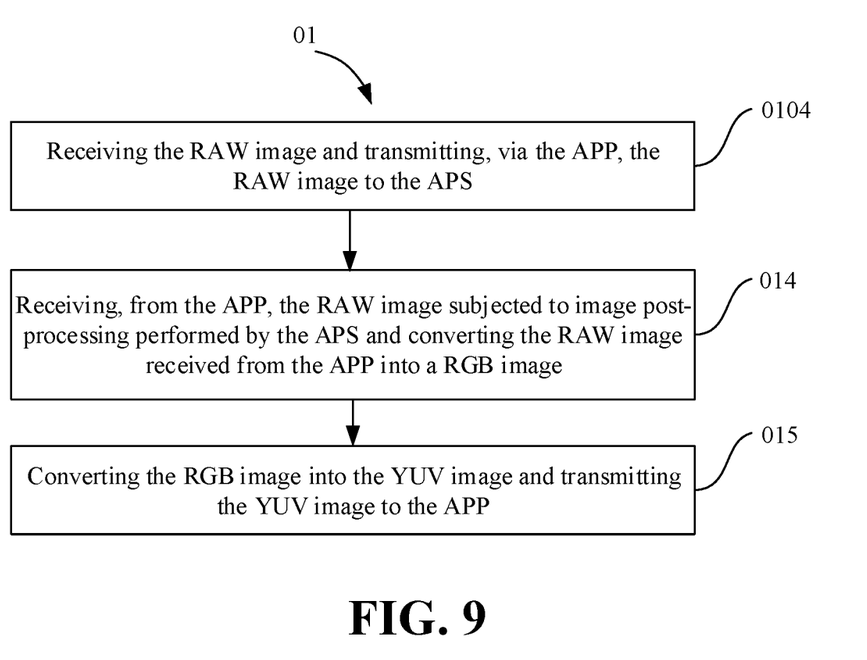

As illustrated in FIG. 1 and FIG. 9, the HAL 12 includes a buffer queue 122 and the operation at block 01 is performed as follows.

At block 0104, the buffer queue 122 receives the RAW image and transmits, via the APP 14, the RAW image to the APS 16.

At block 014, a RAW image subjected to image post-processing performed by the APS is received from the APP 14, and the RAW image received from the APP 14 is converted into an RGB image.

At block 015, the RGB image is converted into the YUV image and the YUV image is transmitted to the APP 14.

In the implementations, the operation at block 0104 can be implemented by the buffer queue 122, the operation at block 014 can be implemented by a RAW-RGB conversion processing unit 124, and the operation at block 015 can be implemented by a noise-reduction and YUV post-processing unit 126.

Figure 10:
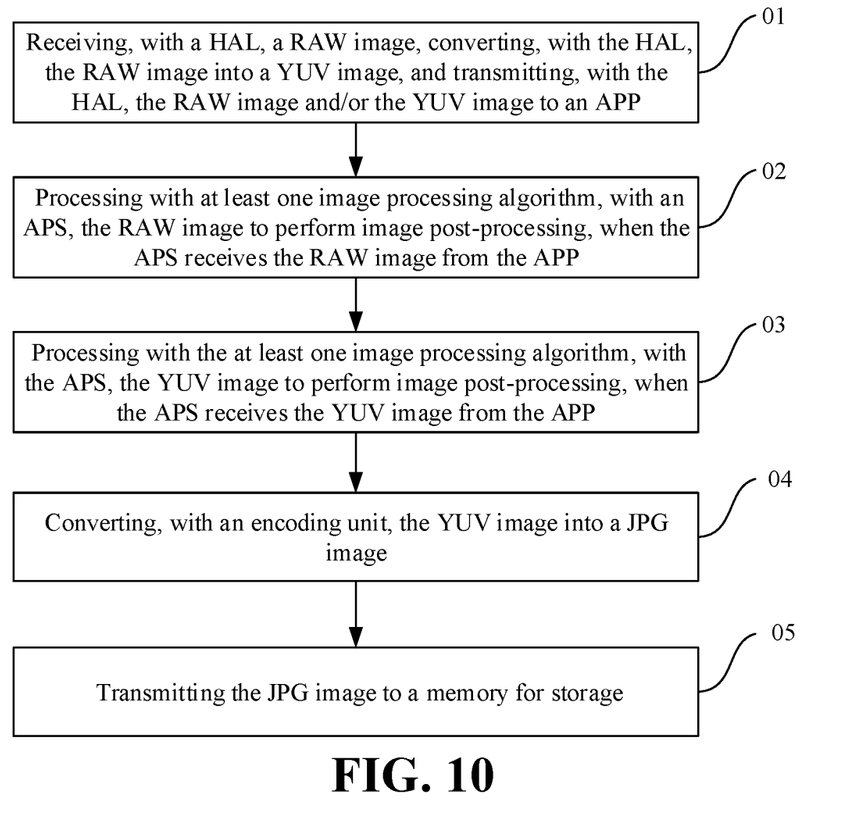

As illustrated in FIG. 10, the method further includes the following.

At block 05, the JPG image is transmitted to a memory for storage.

In the implementations, the operation at block 05 can be implemented by the APS 16.

Figure 11:
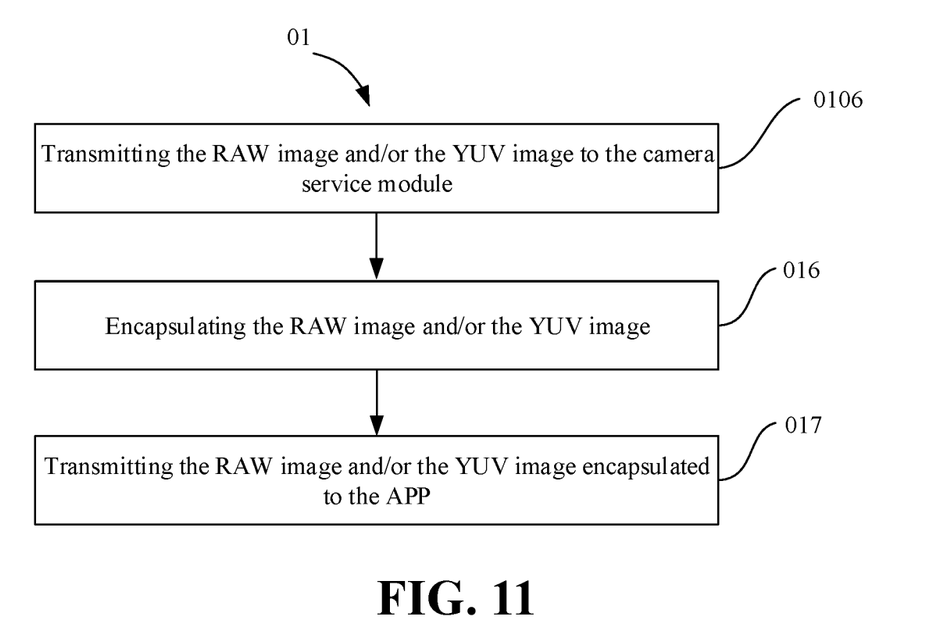

As illustrated in FIG. 3 and FIG. 11, the HAL 12 is coupled with the APP 14 via a camera service module 18, and the operation at block 01 is performed as follows.

At block 0106, the RAW image and/or the YUV image are transmitted to the camera service module 18 by the HAL 12.

At block 016, the RAW image and/or the YUV image are encapsulated.

At block 017, the RAW image and/or the YUV image encapsulated are transmitted to the APP 14.

In the implementations, the operation at block 0106 can be implemented by the HAL 12, and the operations at block 016 and 017 can be implemented by the camera service module 18.

The explanation of the image processing apparatus 10 in the foregoing implementations is also applicable to the method for image processing, and details are not described herein again.

Implementations further provide an apparatus. The apparatus includes at least one processor and at least one memory including computer program codes. The at least one memory and the computer program codes are configured to, with the at least one processor, cause the apparatus to perform: receiving a RAW image, converting the RAW image into a YUV image, and processing, with at least one image processing algorithm, the at least one of the RAW image or the YUV image to perform image post-processing.

Any process or method illustrated in a flow chart or herein in other manners can be understood as a module, a fragment, or a portion of codes that include one or more executable instructions for implementing a particular logical function or operations of a process. The scope of the implementations includes additional implementations in which the functions may be performed out of the order illustrated or discussed. For example, the functions can be performed in a substantially simultaneous manner or in the reverse order according to the functions involved, which should be understood by those skilled in the art.

Logics and/or steps illustrated in the flow charts or described herein in other ways, can be considered as a sequencing table of executable instructions for realizing logical functions, which can be embodied in any computer readable medium to be used by an instruction execution system, a device, or an apparatus (e.g., a computer-based system, a system including a processing module, or other systems that can extract an instruction which is obtained from the instruction execution system, device, or apparatus), or to be used in combination with the instruction execution system, device, or apparatus. In terms of this specification, the "computer readable medium" may be any device that includes or stores communicating programs, propagation or transmission programs used by the instruction execution system, device, or apparatus or can be used in combination with the instruction execution system, device or, apparatus. In particular, the computer readable medium (illustrated in a non-exhaustive list) may include: an electrical connection part (control method) having one or more wires, a portable computer disk cartridge (magnetic device), a random access memory (RAM), a read-only memory (ROM), an erasable programmable read-only memory (EPROM or flash memory), an optical fiber device, and a portable compact disc read-only memory (CDROM). In addition, the computer readable medium even can be paper or other appropriate medium on which the programs are printed, where the programs can be electronically obtained as follows. An optical scanning is conducted on the paper or other medium, followed by editing, interpreting, or processing in other appropriate mode. The programs are stored in a computer memory.

It should be understood that all parts of the implementations can be realized via hardware, software, firmware, or a combination thereof. In the above implementations, multiple operations or methods can be implemented by software or firmware that is stored in a memory and executed by a proper instruction execution system. For example, if the multiple operations or methods are implemented by hardware, as in another implementation, the multiple operations or methods can be implemented with any of the following technologies or a combination thereof known in the art: a discrete logic circuit with a logic gate circuit for realizing logic functions on data signals, a dedicated integrated circuit with an appropriate combined logic gate circuit, a programmable gate array (PGA), a field programmable gate array (FPGA), and so on.

It should be understood by those of ordinary skill in the art that all or part of operations of the method of the above implementations can be implemented by instructing relevant hardware via a program, the program can be stored in a computer-readable storage medium, and when the program is executed, one of operations or a combination of the operations of the method implementations is executed.

Moreover, the functional units in the implementations may be integrated in one processing module, or the units separately and physically exist, or two or more units are integrated in one module. The above-mentioned integrated module may be realized in the form of hardware or a software functional module. When the integrated module is realized in the form of a software functional module and sold or used as an independent product, it can also be stored in a computer-readable storage medium.

The aforementioned storage medium may be an ROM, a magnetic disc, or an optical disc, or the like.

In the description of the specification, the description of the reference terms "one implementation, "some implementations", "examples", or "some examples" refer to the fact that the specific characteristic, structure, or feature described in combination with the implementations or examples is contained in the at least one implementation or example of the disclosure. In the specification, the schematic expression of the above terms unnecessarily aims at the same implementation or example. In addition, the described specific characteristic, structure, or feature can be combined in a proper manner in any one or more implementations or examples.

Although some implementations are illustrated and described above, it should be understood that the implementations are illustrative rather than limiting the present disclosure. Various changes, modifications, substitutions, and variations could be made to the implementations by those of ordinary skilled in the art within the scope of the disclosure.

What is claimed is:

1. An image processing apparatus, comprising:
    a Hardware Abstract Layer (HAL) implemented by a processor and configured to receive a RAW image, to convert the RAW image into a YUV image, and to transmit at least one of the RAW image or the YUV image to an application (APP) implemented by the processor;
    wherein the APP is coupled with the HAL and is configured to transmit the at least one of the RAW image or the YUV image to an Algo Process Service (APS) implemented by the processor;
    wherein the APS is coupled with the HAL via the APP and stores at least one image processing algorithm for image post-processing, wherein the APS is configured to process, with the at least one image processing algorithm, the at least one of the RAW image or the YUV image;
    wherein the HAL is further configured to transmit a suggestion on the number of images to the APP, wherein the suggestion on the number of images is indicative of the number of images needed to be transmitted to the APP, and the number of images have a positive correlation with a shake detection result obtained by a gyro sensor; and
    wherein the APP is further configured to transmit a data request to the HAL according to the suggestion on the number of images, receive data from the HAL, and transmit the data to the APS to perform image post-processing, wherein the data is transmitted to the APP by the HAL according to the data request.

2. The image processing apparatus of claim 1, wherein the HAL comprises:
    a buffer queue implemented by the processor and configured to buffer the RAW image;
    a RAW-RGB conversion processing unit implemented by the processor and configured to convert the RAW image from the buffer queue into an RGB image; and
    a noise-reduction and YUV post-processing unit implemented by the processor and coupled with the APP and configured to convert the RGB image into the YUV image and to transmit, via the APP, the YUV image to the APS.

3. The image processing apparatus of claim 1, wherein the HAL comprises:
    a buffer queue implemented by the processor and configured to buffer the RAW image and to transmit, via the APP, the RAW image to the APS;
    a RAW-RGB conversion processing unit implemented by the processor and configured to receive, from the APP, the RAW image subjected to image post-processing performed by the APS and convert the RAW image received from the APP into an RGB image; and
    a noise-reduction and YUV post-processing unit implemented by the processor and coupled with the APP and configured to convert the RGB image into the YUV image and to transmit, via the APP, the YUV image to the APS.

4. The image processing apparatus of claim 1, wherein the APS comprises an encoding unit implemented by the processor and configured to convert the YUV image into a JPG image or a JPEG image.

5. The image processing apparatus of claim 4, wherein the APS is further configured to transmit the JPG image or the JPEG image to a memory for storage.

6. The image processing apparatus of claim 1, wherein the APS comprises:
    a logic processing invoking layer implemented by the processor and communicating with the APP;
    an algorithm processing layer implemented by the processor and comprising the at least one image processing algorithm; and
    an algorithm module interface layer implemented by the processor and configured to maintain an algorithm interface and to conduct, via the algorithm interface, at least one of a registering operation, an unregistering operation, an invoking operation, or a callback operation on the at least one image processing algorithm in the algorithm processing layer.

7. The image processing apparatus of claim 1, further comprising a camera service module implemented by the processor, wherein the HAL is coupled with the APP via the camera service module, and the camera service module is configured to:
    encapsulate the at least one of the RAW image or the YUV image and transmit the at least one of the RAW image or the YUV image encapsulated to the APP; and
    transmit a RAW image returned by the APP to the HAL.

8. A method for image processing, comprising:
receiving, with a Hardware Abstract Layer (HAL), a RAW image, converting, with the HAL, the RAW image into a YUV image, and transmitting, with the HAL, at least one of the RAW image or the YUV image to an application (APP);
performing at least one of:
    processing with at least one image processing algorithm, with an Algo Process Service (APS), the RAW image from the APP to perform image post-processing, when the APS receives the RAW image from the APP; or
    processing with the at least one image processing algorithm, with the APS, the YUV image from the APP to perform image post-processing, when the APS receives the YUV image from the APP;
transmitting, with the HAL, a suggestion on the number of images to the APP, wherein the suggestion on the number of images is indicative of the number of images needed to be transmitted to the APP, and the number of images have a positive correlation with a shake detection result obtained by a gyro sensor; and
transmitting, with the APP, a data request to the HAL according to the suggestion on the number of images, receiving, with the APP, data from the HAL, and transmitting, with the APP, the data to the APS to perform image post-processing, wherein the data is transmitted to the APP by the HAL according to the data request.

9. The method of claim 8, wherein the HAL comprises a buffer queue, and receiving, with the HAL, the RAW image, converting, with the HAL, the RAW image into the YUV image, and transmitting, with the HAL, the at least one of the RAW image or the YUV image to the APP comprises:
    receiving, with the buffer queue, the RAW image;
    converting the RAW image from the buffer queue into an RGB image; and
    converting the RGB image into the YUV image and transmitting the YUV image to the APP.

10. The method of claim 8, wherein receiving, with the HAL, the RAW image, converting, with the HAL, the RAW image into the YUV image, and transmitting, with the HAL, the least one of the RAW image or the YUV image to the APP comprises:
    receiving the RAW image and transmitting, via the APP, the RAW image to the APS;
    receiving, from the APP, the RAW image subjected to image post-processing performed by the APS and converting the RAW image received from the APP into an RGB image; and
    converting the RGB image into the YUV image and transmitting the YUV image to the APP.

11. The method of claim 8, wherein the APS comprises an encoding unit and the method further comprises:
    converting, with the encoding unit, the YUV image into a JPG image or a JPEG image.

12. The method of claim 11, further comprising:
    transmitting the JPG image or the JPEG image to a memory for storage.

13. The method of claim 8, wherein the APS comprises a logic processing invoking layer communicating with the APP, an algorithm processing layer comprising the at least one image processing algorithm, and an algorithm module interface layer, and the method further comprises:
    maintaining, with the algorithm module interface layer, an algorithm interface; and
    conducting via the algorithm interface, with the algorithm module interface layer, at least one of a registering operation, an unregistering operation, an invoking operation, or a callback operation on the at least one image processing algorithm in the algorithm processing layer.

14. The method of claim 8, wherein the HAL is coupled with the APP via a camera service module, wherein transmitting, with the HAL, the at least one of the RAW image or the YUV image to the APP comprises:
    transmitting, with the HAL, the at least one of the RAW image or the YUV image to the camera service module;
    encapsulating, with the camera service module, the at least one of the RAW image or the YUV image; and
    transmitting, with the camera service module, the at least one of the RAW image or the YUV image encapsulated to the APP.

15. An electronic device, comprising an image processing apparatus and an image sensor implemented by a processor and coupled with the image processing apparatus, wherein the image processing apparatus comprises:
    a Hardware Abstract Layer (HAL) implemented by the processor and configured to receive a RAW image, to convert the RAW image into a YUV image, and to transmit at least one of the RAW image or the YUV image to an application (APP) implemented by the processor;
    wherein the APP is coupled with the HAL and is configured to transmit the at least one of the RAW image or the YUV image to an Algo Process Service (APS) implemented by the processor;
    wherein the APS is coupled with the HAL via the APP and stores at least one image processing algorithm for image post-processing, wherein the APS is configured to process, with the at least one image processing algorithm, the at least one of the RAW image or the YUV image;
    wherein the HAL is further configured to transmit a suggestion on the number of images to the APP, wherein the suggestion on the number of images is indicative of the number of images needed to be transmitted to the APP, and the number of images have a positive correlation with a shake detection result obtained by a gyro sensor; and
    wherein the APP is further configured to transmit a data request to the HAL according to the suggestion on the number of images, receive data from the HAL, and transmit the data to the APS to perform image post-processing, wherein the data is transmitted to the APP by the HAL according to the data request.

16. The electronic device of claim 15, wherein the electronic device further comprises a receiver implemented by the processor, wherein
    the receiver is configured to receive an input; and
    the APP is further configured to generate a control instruction in response to the input and to transmit, via the HAL, the control instruction to the image sensor to control the image sensor to collect an image.

17. The electronic device of claim 16, wherein the image sensor is configured to:
    transmit shooting data to the HAL when one shooting is completed; and
    perform another shooting when the APS receives a RAW image or a YUV image corresponding to the shooting data.

18. The electronic device of claim 15, wherein the APS comprises an encoding unit implemented by the processor and configured to convert the YUV image into a JPG image or a JPEG image.

19. The electronic device of claim 18, wherein the APS is further configured to transmit the JPG image or the JPEG image to a memory for storage.

* * * * *